Oct. 16, 1945.　　　G. E. TARDIFF　　　2,386,821
METHOD OF MAKING A LAMINATED STRUCTURE
Filed Oct. 27, 1942　　　2 Sheets-Sheet 1
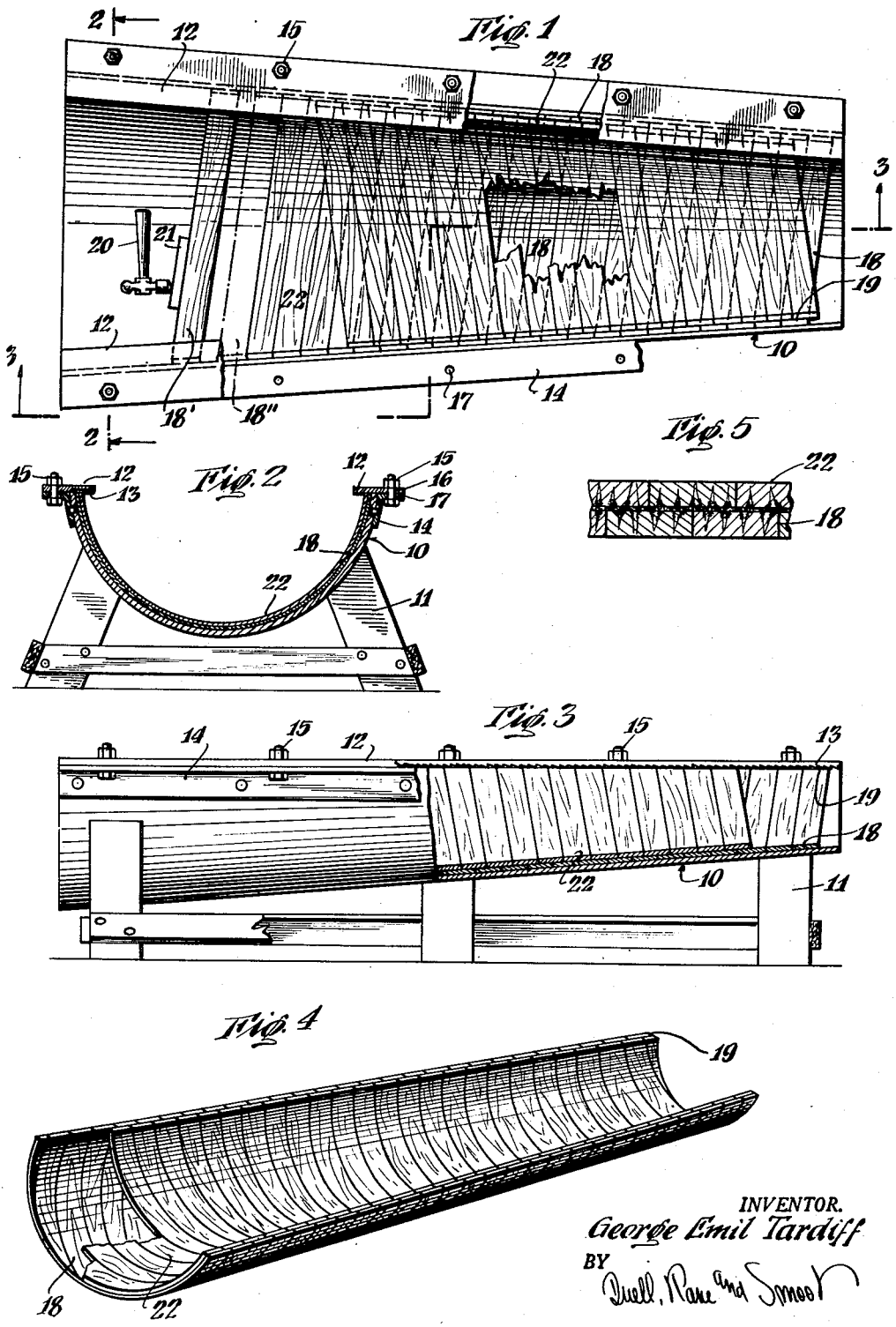
INVENTOR.
George Emil Tardiff
BY
ATTORNEYS Oct. 16, 1945.   G. E. TARDIFF   2,386,821
METHOD OF MAKING A LAMINATED STRUCTURE
Filed Oct. 27, 1942   2 Sheets-Sheet 2
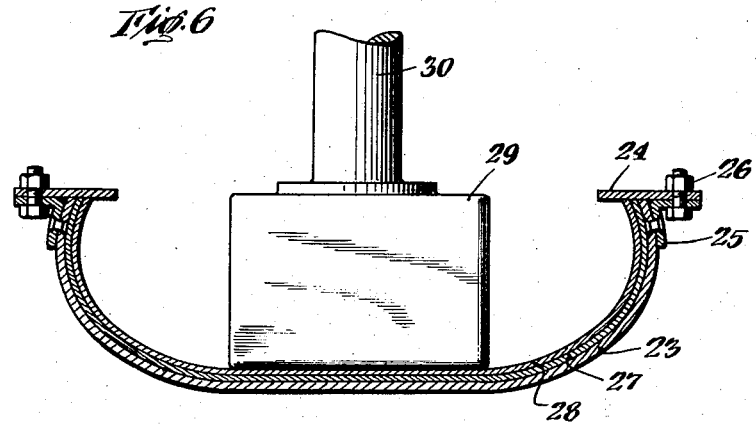
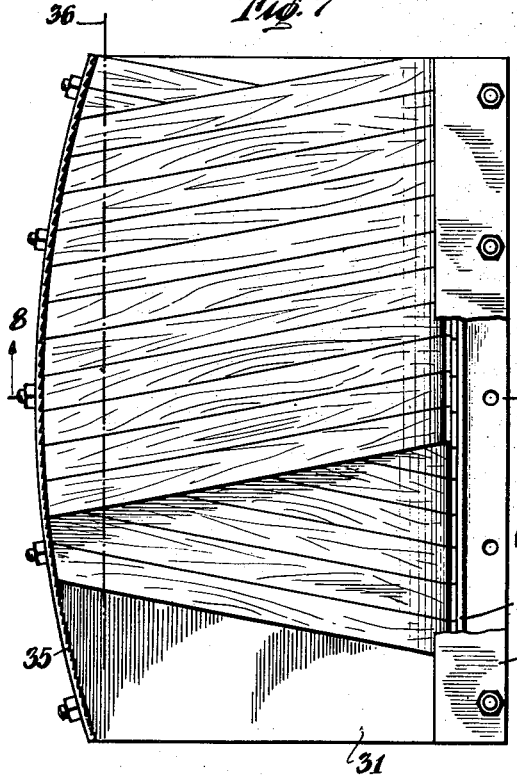
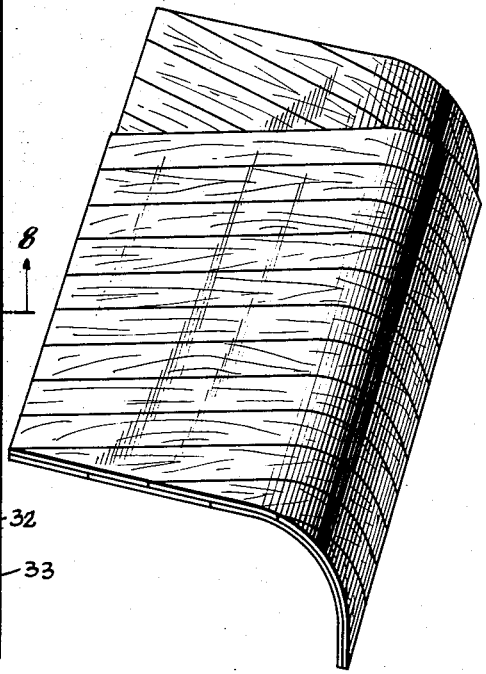
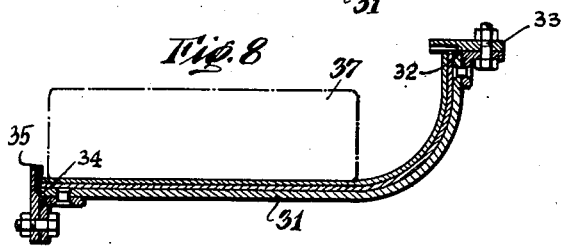
INVENTOR.
George Emil Tardiff
BY
ATTORNEYS Patented Oct. 16, 1945

2,386,821

UNITED STATES PATENT OFFICE 2,386,821

METHOD OF MAKING LAMINATED STRUCTURES

George Emil Tardiff, Beechurst, N. Y.

Application October 27, 1942, Serial No. 463,496

7 Claims. (Cl. 144—309)

This invention relates to a new and novel structure including, at least in part, curved shapes; as well as the method of construction and formation of such structures. This invention has special application to the manufacture of all types of curved wood surfaces and comprises a novel method of building up or molding wood veneers to such shapes by expanding inner layers of wood into outer layers.

It is an object of the invention to provide a new molded veneer structure as well as new means for forming wood layers into various curved shapes and uniting together superimposed layers, so shaped, under compression.

It is a further object to obtain the compression for uniting the superimposed layers by new and novel means.

A still further object of my invention is to utilize the absorptive qualities of dry wood to create an expanding force and then to utilize said expanding force in cooperation with a mold to aid in the bonding of superimposed wood layers wherein the bonding medium is a glue or suitable adhesive which impregnates and causes expansion of said wood, at the same time as it provides the bonding medium for adjacent, as well as superimposed, wood layers.

Further objects of my invention are the provision of a novel mold and means utilized in connection with said mold for retaining the wood veneers in a wedged position conforming to the shape of the mold while being bonded together, and the provision of a new and novel means for compressing adjacent plank edges into tight engagement.

A further object is the construction of a hollow, ribless, wood structure capable of withstanding severe use and involving inexpensive, cold construction from readily available materials.

My novel method is adaptable for use in the construction of many wood products such as airplane fuselages and wings, boats, automotive bodies as well as many other small and large objects to which my novel method and mold will be readily applicable as will be understood by those skilled in the art.

While in the accompanying drawings I have illustrated the application of my invention to three specific shapes, it will be clear that the variation of shapes may, within the spirit and disclosures of my invention, be very extensive without in any manner departing from its teachings.

Referring to the drawings:

Fig. 1 is a top view, with certain portions broken away to show the underlying construction, of a mold with veneers or layers therein, the mold taking approximately the structural form of airplane fuselages and similar shapes.

Fig. 2 is a vertical cross section taken along the line 2—2 of Fig. 1 and looking in the direction of the arrows.

Fig. 3 is a vertical view of Fig. 1 taken along the line 3—3 thereby showing a portion of the outside of the mold as well as a vertical section through the center line of the mold.

Fig. 4 is a view of the molded product after removal from the mold.

Fig. 5 is a cross sectional view of two wood laminations showing the grain structure and the penetration of the adhesive.

Fig. 6 is a vertical section taken through a further mold of a shape more closely approximating the shape of a boat hull or similar object.

Fig. 7 is a top plan view of another and modified form of mold.

Fig. 8 is a vertical section taken along the line 8—8 of Fig. 7.

Fig. 9 is a perspective view of the molded unit formed in Figs. 7 and 8 after removal from the mold and a trimming or cutting of one edge.

Referring now to the drawings, my new structure and the method for carrying out my invention will be explained in detail.

In Figs. 1, 2 and 3 there is provided a mold 10 which, as illustrated, takes a generally semi-circular shape of decreasing cross sectional areas and which may be formed of any suitable material such as wood, metal or plastic. As illustrated, this mold is mounted on a frame structure 11 which is of a height sufficient to provide easy access by workmen into the interior of the mold. This frame is, of course, of any suitable shape for stability or, if desirable, may be omitted entirely.

Mounted along the two top edges of the mold are the compression retaining lips or flanges 12, preferably formed on the under side, which protrude over the mold cavity, with a series of adjacent teeth 13 positioned angularly to provide a gripping action for the planks or veneers which will subsequently be forced into place as hereinafter described. The cavity in the mold of course represents the shape of the finished product desired and will vary as before indicated dependent on the shape being reproduced.

Flanges 12 are preferably detachably mounted to the mold 10 by means of the angle irons 14, riveted, welded or otherwise secured to the frame by one arm, and having another arm to which the flanges 12 are removably secured by means of the nuts and bolts 15 which pass through the aligned holes 16 and 17 of the angles and the flanges respectively.

While I have described a specific new mold developed by me and which I have found adaptable to the structural shapes mentioned, it must of course be borne in mind that broadly my new structure and my new method are not dependent upon the details of this mold and alternative structures may be utilized if desired.

Inside of this mold or frame I then construct the wood veneer structure in the following manner. A series of planks, boards or veneers for forming the first or outer layer, illustrated by the numerals 18, are pre-cut to pattern. This pattern is, of course, made from the dimensions of the mold so that the planks cut in conformity with it are of increasing lengths ranging from the shortest which is adapted for a tight wedge fit at the small end of the mold between the opposing flanges 12, to those that will fit at the larger sections of the mold. It is preferable to place these planks at an angle to a transverse section of the frame and, accordingly, the length of the planks is somewhat greater than if they were placed transversely across the frame. It is additionally observed that a taper is given to the edge 19 of the planks thus providing for contact with the under side of the flanges 12, for substantially the entire length of edge 19.

The planks used are preferably formed from quarter sawn wood and it is preferable to have the grain run vertical to the upper and lower surfaces or faces of the planks as is illustrated by the grain shown in Figs. 1 and 5. The wood should be thoroughly dry. This dryness acting in conjunction with the choice of grain positioning permits a deep penetration of adhesive and is important in the achieving of a rigid, tight structure. Wood of a thickness from about ⅛ inch to ¼ inch has been found desirable although it should be pointed out that the thickness of the wood used may vary depending upon the amount of bending that is necessary. It is desirable in the present invention that the wood be bent and then the adhesive or glue applied while the wood is dry, not moistened or steamed. The thickness of the wood should, therefore, be no greater than that which permits the bending in such dry form, or permits bending by use of substances which dry out before the adhesive is applied. Wood that is dry, stiff and long grained as, for example, the wood that is used in the construction of wood Venetian blinds, is highly adaptable to use in the present method.

While I have indicated in the various figures the use of rather long and narrow strips of wood, the process would be equally applicable with wood of greater width, it being constantly borne in mind that the only limitation is the ability to bend or form the wood to the shape of the mold in some manner without cracking or splitting.

In starting the construction within the mold, I take the first plank which is to be put in place, namely the shortest one, and placing it inside of the mold, bend it so as to conform generally to the shape of the mold with each edge of the plank resting under the lip or flange 12. In this form the plank cannot expand and therefore cannot leave the mold. I then take a hammer or other suitable tool and tap the plank toward the small end of the form, i. e. toward the end where it is being constantly more constricted. This wedging action due to the plank being forced into a more constricted space causes the plank to intimately contact the mold throughout the length of the plank.

This process of forcing the planks forward into position is shown in Fig. 1 wherein plank 18' has just been placed in the mold and is being tapped forward by use of the hammer 20. A block of wood 21 has been placed between the hammer and the plank 18' so as to prevent any injury to the plank while it is being hammered forward into its more constricted space. Plank 18' will, after it has been hammered or forced completely forward, take a position directly adjacent plank 18" as illustrated by the dotted lines.

The teeth 13, or other suitable retaining means, hold the plank in this constricted position and prevent it from sliding backward into a space that would permit of its greater expansion. While the teeth 13 have been indicated as a preferred means of holding the plank in place, it should be clear that other means such as, for example, clamps might be used. Thereafter the second plank—being slightly longer than the first—is conformed to the shape of the mold and tapped or urged forward into its constricted position which is directly adjacent and in intimate contact with the first plank. The intimate contact is assured because the forward edge of the second plank is the same length as the rear edge of the first plank thereby assuring that their edges will meet. This process is then repeated until the first layer of planks is in position.

The first layer, which is now in the mold, as well as the planks 22 for forming the second layer, are coated with a suitable bonding material such as waterproof glue and, due to the dryness of the wood, this adhesive or glue impregnates the planks. This impregnation is aided to a considerable extent due to the fact that the grain structure presents an opening permitting the adhesive to work into the wood.

The planks 22 of the second layer are then each superimposed on the first layer and forced into position in a manner similar to that explained in connection with the first layer. In order to achieve a cross graining, these planks are positioned at an angle opposite to the angle at which the first planks have been positioned, but the crossing angle of the planks is preferably less than a right angle. It has been found that this less than a right angle crossing eliminates any tendency of the planks to separate on expansion or contraction. When the second planks are wedged forward into their constricted positions, they are forced throughout their entire length into intimate contact with the first or underneath planks.

Thereafter, due to the absorption of the adhesive into the dry wood of both the first and second planks, a slight expansion of the planks takes place. Since the planks cannot expand at the ends in view of the constriction caused by the flanges 12, the entire force of this expansion is exerted in causing more intimate contact between the planks through their entire lengths.

In addition, due to the action of the adhesive which is placed between the layers a sliding action of the layers one over the other is permitted and a strong cohesive force is obtained serving to keep the planks in intimate face-to-face contact. It has been found that the absorption is considerable and that the planks in their finally bonded form have practically no layer of adhesive between them, but that the adhesive has been absorbed to a considerable extent into the wood.

The amount of adhesive used must be sufficient to secure a complete bonding of the two layers as well as some impregnation. The compression resulting in the intimate association of the two layers may be due to both the wedging action forcing the planks forward into a more constricted space as well as the expansive action due to the absorption of the adhesive into the wood layers with the wood layers being prevented from expanding at their free ends.

After the adhesive has had sufficient time to set the molded form may be removed from its mold by sliding it out of the wide end of the mold or by removing the nuts and bolts 15 thus permitting the flanges 12 to be lifted off. In structures which work from a wide central section to more constricted portions at both ends, such as, for example, hulls of boats, it would not be possible to remove the form from the mold other than by raising it upward and accordingly the provision of the removable flanges 12 in such circumstances would be absolutely necessary. It is also to be pointed out that in such types of molds the planks would be formed or placed in position from both ends toward the middle.

Fig. 4 shows the form after it has been removed from the mold and illustrates, by the broken section, the manner in which the cross graining of the planks has been achieved. The form of Fig. 4 can be stiffened if necessary by the application thereto of struts, stringers or other stiffening means and can, of course, be united with a mated structure, if desirable, to form a completely enclosed shape.

Fig. 6 shows the method of the present invention being used on a somewhat modified mold more closely resembling the shape of a boat structure. Fig. 6 is, for example, a vertical section taken through one portion of the boat. To one side of this vertical section the boat tapers to the bow while to the other side the boat tapers to the stern. The tapering or constricting effect as it bears on the invention has been explained in connection with Fig. 1 and therefore the tapering of a boat hull in connection with Fig. 6 is not illustrated. It will be observed that the structure illustrated of the mold 23, flanges 24, angle 25 and nuts and bolts 26 is similar to that previously described. The planking 27 and 28 is placed in position in a manner similar to that described in Figs. 1–3, however, due to the central flat portion of the mold, there may be a tendency on the part of the planks to raise in the center while maintaining intimate and firm contact through their curved portions. In order to overcome this difficulty, I utilize in connection with my mold a controlled press diagrammatically illustrated at 29 which press may be applied by means of the shaft 30 which is actuated by a pressure apparatus or which may be dropped into position and held there solely by gravity, or any other suitable means.

Figs. 7 to 9 inclusive illustrate the application of my invention to structures which in and of themselves may not have a tapering shape suitable for the creation of the constricted areas required for achieving the compressive action. In these figures I have illustrated the application to a structure which, for example, might form the top or roof of an automobile or station wagon. Essentially the problem is handled by building up a structure which provides for the constricting areas and resultant compressive forces and then after removing the structure from the mold, cutting off, if necessary, the portions not needed.

Referring to the drawings, it will be seen that the mold 31 is shaped on one side with the straight edge 32 to which is secured a flange 33 in the manner similar to that described with reference to the other structures. The other edge 34 of the mold 31 is made arcuate in shape and is likewise provided with a flange 35 again secured to the mold 31 in any suitable manner, but preferably as previously described in connection with Figs. 1–3. The planks are then inserted working from both ends of the mold toward the middle and the wedging action, as will readily be seen by reference to Fig. 7, is achieved by driving or wedging the planks toward either end of the mold. After the structure has been formed in the mold it can, if necessary, be cut along the line 36 as illustrated in Fig. 7 thereby removing the portion to the left of the line in that figure. Thus the portion which had to be added in order to provide for the building up of the wedging action of the edge 34 does not interfere with the desired shape.

In Fig. 8 the pressure block 37 as illustrated in dotted lines and, of course, as explained in connection with Fig. 6 may be used if needed to overcome any tendency on the part of the planks to raise throughout an area where the curvature is not sufficient to secure the complete bonding action.

By the utilization of the molds and method as described in connection with Figs. 7 and 9 any variety of shapes may be readily produced even though the natural contours of the article are not sufficiently curved to provide the necessary constricting areas.

In all of the various forms of the invention the product may be treated either before or after removal from the mold by any suitable surfacing as, for example, painting, varnishing, polishing, etc. depending of course, on the use to which the article will be put.

I have thus described the structures and method achieving all of the objects of my invention so that those skilled in the art may readily understand them.

While I have described my invention with reference to the annexed drawings it is to be understood that I do not intend thereby to be limited to the specific drawings illustrated, but desire to cover my invention in its broad aspects and only as limited in the accompanying claims.

I claim:

1. A method of conforming wood layers to the internal shape of a mold having decreasing cross-sectional areas, comprising placing a succession of relatively thin wood planks transversely within the mold at a zone thereof having a relatively large cross sectional area, forcing said planks towards a smaller end of the mold in a direction longitudinally of the mold while restraining said planks at their ends and substantially maintaining the original transverse disposition thereof, and securing said planks to retain substantially the shape afforded thereto by the mold.

2. A method as in claim 1, in which the securement of said planks is effected by coating the exposed surface of said first-named succession of planks with adhesive after finally positioning the same in said mold, placing a second succession of planks within said mold transversely thereof and forcing the planks toward a smaller end of the mold while restraining the said planks at their ends to urge said planks into surface-to-surface bonded relationship with said first-named planks, with the planks of the second layer bridging the joints between those of the first layer.

3. A method of making a concave laminated structure of variant cross sectional area, comprising placing a thin, but inherently stiff, strip of material transversely across a mold having an interior shape conforming to the ultimate shape of the structure; forcibly bending said strip into the approximate internal shape of the mold; moving said strip longitudinally of the mold, while restraining the ends of said strip against movement outwardly of said mold, to a location of lesser cross sectional area of the mold until said strip is brought into intimate contact with the interior surface of said mold; successively similarly placing sufficient additional strips within said mold to complete the first lamination, adjacent strips being in edge to edge contact over substantially their full length; similarly placing other successions of strips transversely of said mold and so positioned that each strip of an upper layer bridges more than one strip of its immediately lower layer; and bonding said layers together to maintain said laminated structure in substantially the shape of the mold when removed from the mold.

4. A method of making a wood veneer structure of gradually lessening cross-sectional area, comprising disposing transversely within a mold having the desired ultimate shape of the structure, a succession of relatively thin strips of wood, continuously confining the ends of said strips, urging each said strip longitudinally of said mold into a location within said mold which has a periphery slightly less than the initial length of the strip while restraining the ends of said strip against any movement except longitudinally of said mold, moving said strips into relatively close edge to edge adjacency to form a first lamination of the ultimate structure, coating said first lamination with adhesive, and similarly applying a second succession of strips over the first lamination, the strips of said second layer bridging the joints between strips of said first layer, permitting the adhesive to bond the said laminations, and then removing the structure from the mold.

5. A method of forming molded curved wood structures comprising placing a plurality of relatively thin, narrow, planks of dry wood within an open-topped mold, causing said planks to assume the shape of the mold, restricting the ends of the planks against movement, bringing said planks into edge to edge relationship saturating the wood with adhesive, whereby expansion of the wood is effected, and superimposing a second layer of thin, narrow, planks of dry wood on the adhesive-coated surface of the initially positioned planks, and permitting said second layer of planks to absorb the adhesive while at the same time holding the ends of said second layer of planks against movement.

6. A method as provided in claim 5 wherein the inner and outer layers are angularly disposed with respect to each other, said angle being less than a right angle, and such that each piece of the inner layer of wood bridges more than one piece of the first or outer layer of wood.

7. A method of forming relatively thin strips of material into the internal shape of a generally concave, elongate, mold structure having progressively smaller cross-sectional areas, comprising placing a succession of said strips within said mold and extending angularly with respect to the longer axis thereof, restraining the ends of each strip against movement outwardly of said mold while moving said strip longitudinally of said mold into a location of lesser cross-sectional area to bring it into intimate contact with the interior of the mold, each of the succession of strips being brought into edge to edge relationship with its adjacent strip over substantially the full length thereof, and mutually securing said strips to prevent the same from reverting to their original shape upon removal from said mold

GEORGE EMIL TARDIFF.